United States Patent [19]

Daitoku et al.

[11] Patent Number: 4,540,264

[45] Date of Patent: Sep. 10, 1985

[54] PHOTOGRAPHING LENS FOCUSING DEVICE

[75] Inventors: Koichi Daitoku, Kanagawa; Nobuo Okabe, Tokyo, both of Japan

[73] Assignee: Nippon Kogaku K.K., Tokyo, Japan

[21] Appl. No.: 665,398

[22] Filed: Oct. 26, 1984

[30] Foreign Application Priority Data

Oct. 28, 1983 [JP] Japan .............................. 58-202330

[51] Int. Cl.³ .............................................. G03B 13/18
[52] U.S. Cl. ................................. 354/400; 354/195.12
[58] Field of Search ............ 354/400, 402, 403, 195.1, 354/195.12

[56] References Cited

U.S. PATENT DOCUMENTS 4,505,566 3/1985 Noguchi .............................. 354/403

Primary Examiner—Russell E. Adams
Attorney, Agent, or Firm—Finnegan, Henderson, Farabow, Garrett & Dunner

[57] ABSTRACT

A focusing device in a camera comprises a lens barrel having a lens system, the lens barrel together with the lens system being moved along the optical axis to focus the lens system on an object locted in the range of ordinary photographing distances and on an object located in the range of closest focusing distances shorter than the ordinary photographing distances, a detector for detecting a distance to an object, to provide an output signal according to the distance thus detected, a main drive system for moving the lens barrel in response to the output signal provided by the detector, to focus the lens system on the object located in the range of ordinary photographing distances, and an auxiliary drive system with a member operated by the operator. The auxiliary drive system moving the lens barrel independently of the main drive system, to focus the lens system on the object located in the range of closest focusing distances.

5 Claims, 2 Drawing Figures

4,540,264

PHOTOGRAPHING LENS FOCUSING DEVICE

BACKGROUND OF THE INVENTION

1. Field of the Invention

This invention relates to the automatic focusing operation of a camera, and more particularly to a photographing lens focusing device.

2. Description of the Prior Art

If, in a macro-photographing operation using an automatic focusing camera, it is intended to focus the photographing lens on the object at the closest focusing distance merely displacing the photographing lens in the direction of the optical axis, then it is necessary that, after the photographing lens has been displaced to focus on an object at an ordinary photographing distance, the photographing lens is further displaced to focus on the object at the closest focusing distance. That is, the amount of displacement of the photographing lens is large. Accordingly, the displacement detecting member, the displacement limiting member and the drive mechanism are necessarily intricate in construction. Furthermore, as it takes a relatively long time to displace the photographing lens, the time interval which lapses from the time instant that the shutter is released until the shutter is actually opened is also relatively long, which makes it rather difficult to perform the photographing operation.

Futhermore, a method of moving a close-up lens in front of the photographing lens with an automatic focusing function auxiliary used may be employed. However, in this case, the construction of the camera necessarily becomes intricate. Therefore, employment of the method is not practical.

On the other hand, there has been a demand for realization of the technique that, where it is required to take a picture of an object at a distance shorter than the close-up photographing distance limit, e.g. 0.8 m, in the range of ordinary photographing distances, the photographing lens can be focused on the object without using high photographing technique, i.e., by changing the close-up photographing distance limit directly (skipping over the intermediate distance) to a closest focusing distance of 0.4 m for instance at the sacrifice of continuity.

SUMMARY OF THE INVENTION

In view of the foregoing, an object of this invention is to provide an automatic focusing camera simple in construction which can perform an macro-photographing operation.

In order to achieve the foregoing object and other objects of the invention, the camera of the invention comprises: lens drive means for displacing the photographing lens in the direction of the optical axis according to a distance detection signal provided by a control section, to focus the photographing lens on an object; auxiliary lens drive means for displacing the photographing lens to a macro-photographing position from an ordinary photographing position independently of the aforementioned lens drive means; and auxiliary operating means for operating the auxiliary lens drive means independently of the firstly mentioned lens drive means, to immediately place the camera in the macro-photographing state.

DETAILED DESCRIPTION OF THE PREFERRED EMBODIMENT

Figure 1:
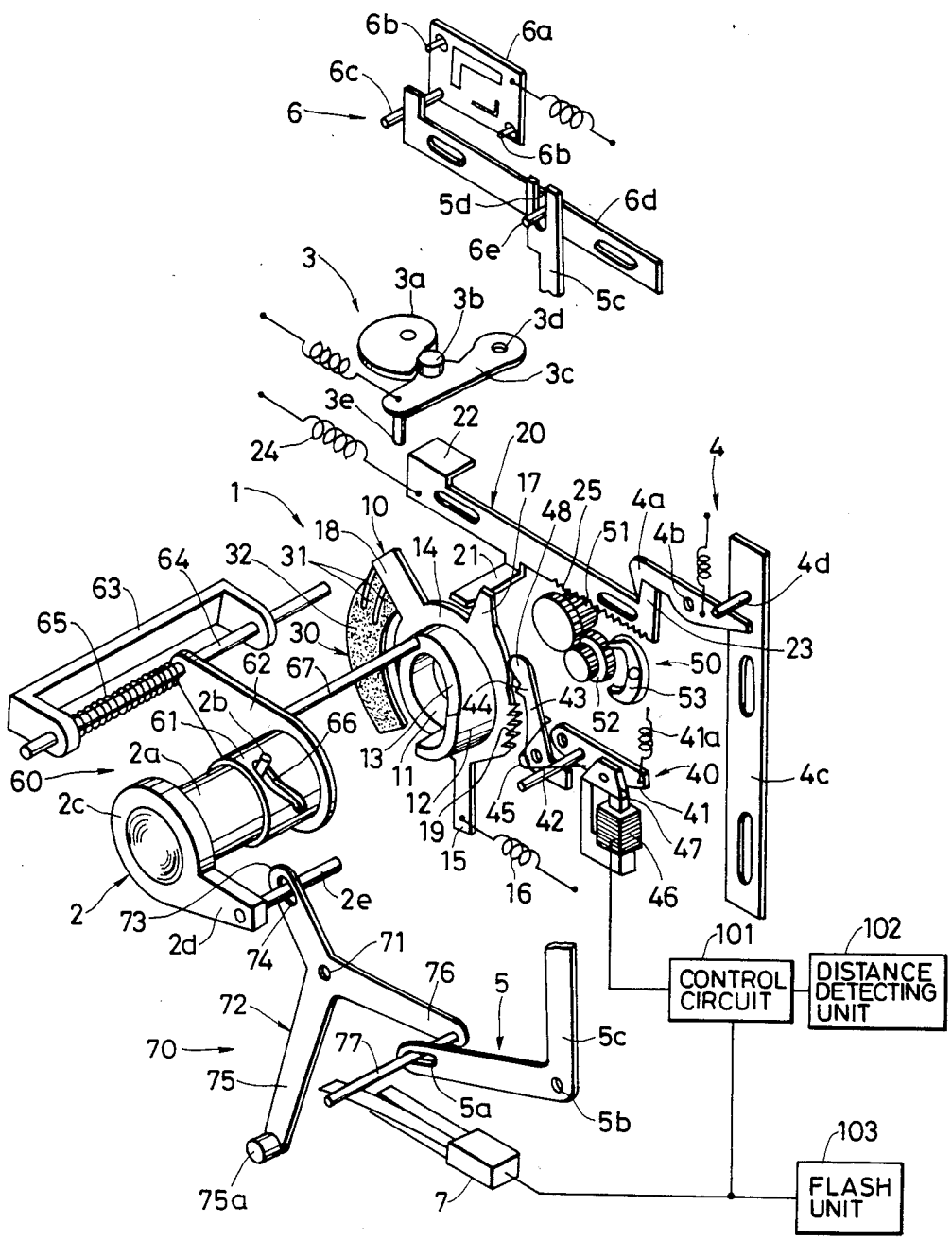
FIG. 1 is an exploded perspective view showing a photographing lens focusing device which is one embodiment of this invention.

As shown in FIG. 1, a lens drive device 1 comprises: a rotary cam member 10 rotatably supported on a camera housing (not shown), for pushing a photographing lens 2; a slider 20 engaged with the cam member 10 to turn the latter; a displacement detecting member 30; a displacement limiting member 40; and a governor mechanism 50. In addition to the lens drive device 1, an auxiliary lens drive device 60 and an auxiliary operating device are provided.

The rotary cam member 10 is positioned behind the photographing lens 2. The cam member 10 has a through-hole at the center which defines the optical path of an incident beam from the photographing lens 2; i.e., the cam member 10 has an arcuate cam wall 12 outside the optical path. The top surface of the cam wall 12 forms a cam portion 13 whose height is gradually changed in the direction of displacement of the photographing lens 2. A locking arm 15 is extended from a control plate 14 in such a manner that it spreads radially of the base of the cam wall 12. A sprig 16 is connected to the locking arm 15 so as to urge the rotary cam member 10 to turn counterclockwise.

The slider 20 is supported by the camera housing in such a manner that it is slidable in parallel with the tangent to the circle which is formed when the cam member 10 turns. A locking piece 17 is extended from the control plate 14 of the cam member 10. An arm 21 is extended from the middle portion of the slider in such a manner that the arm 21 is engaged with the locking piece 17 only in the direction of depression. One end portion of the slider is formed into an engaging portion 22, and the other end portion is formed into a locking portion 23. The slider is urged to the left (in FIG. 1) by a spring 24.

A cam mechanism 3 is provided adjacent to the engaging portion 22 of the slider 20. The cam mechanism 3 operates when a film winding mechanism (not shown) is operated. The cam mechanism 3 comprises: a cam 3a; and a charge lever 3c with a cam follower 3b which rocks as the cam 3a turns. The charge lever 3c is pivotally mounted on a shaft 3d at one end. A pin 3e is embedded in the other end of the charge lever 3c in such a manner that it can be pushed against the engaging portion 22 of the slider.

A release member 4 is provided adjacent to the locking portion 23 of the slider 20. The member 4 has a locking hook 4a which is pivotally mounted on a shaft 4b secured to the camera housing, in such a manner that the hook 4a is engaged with and disengaged from the locking end portion 23 of the slider. The member 4 has a lever 4c for disengaging the hook 4a from the locking portion 23. The lever 4c has a pin 4d which is engaged with the hook 4a.

The displacement detecting member 30 comprises: a contact 31 connected to a detecting piece 18 which is extended from the rotary cam member 10; and a signal generating board 32 which is shaped arcuate according to the locus of the contact 31. The board 32 generates a displacement signal representative of an amount of displacement which is detected by the contact.

The displacement limiting member 40 has a locking lever 43 which is pivotally mounted on the pin 42 which is embedded in one end portion of a control lever 41. One end portion of the locking lever 43 is formed into a locking pawl 44 which is moved into and out of engagement with a tooth of the arcuate teeth 19 which are formed in a part of the periphery of the cam member 10. The locking pawl 44 is urged by a spring 45 so as to engage with the teeth. The control lever 41 is urged by a spring 41a to turn counterclockwise. Furthermore, an armature is fixedly secured to the control lever 41 in such a manner that it is attracted by a magnet 46.

The locking lever 43 has a protrusion 48 which, when the slider 20 is energized to make the cam member 10 ready for start, is engaged with the edge of the control plate 14 so that the armature 47 can be attracted by the magnet 46. The magnet 46 is so connected to a camera control circuit 101 that the amount of rotation of the control plate 14 and the cam member 10 is controlled according to a photographing distance. The control circuit 101 is connected to a distance detecting unit 102 to obtain a distance detection signal.

The governor mechanism 50 comprises: a gear train 51 engaged with a rack 25 of the slider 20; and an anchor 53 engaged with an escapement wheel 52 coupled to the gear train 51.

The auxiliary lens drive device 60 comprises: a rotation preventing arm 62 extended from the base end of a cam cylinder 61 into which the lens barrel 2a of the photographing lens 2 is inserted; a guide member 63 secured to the camera housing; and a guide bar 64 supported by the guide member 63 in such a manner that it is in parallel with the direction of displacement of the photographing lens 2. The end portion of the arm 62 is slidably mounted on the guide bar 64 and it is urged in the direction of retraction of the lens by the spring 65.

Figure 2:
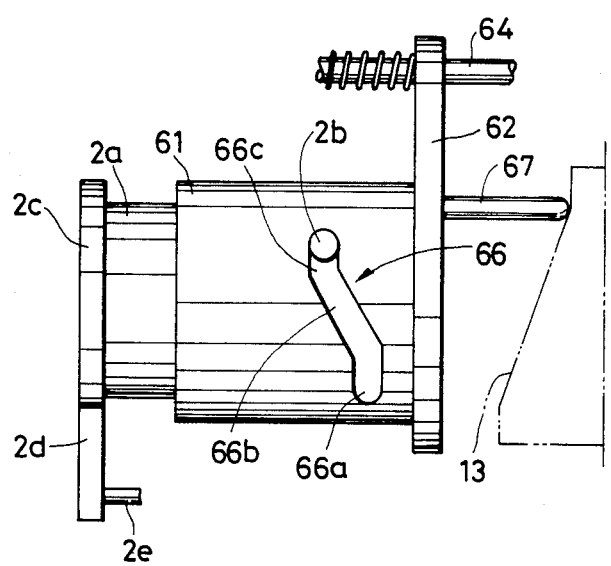
FIG. 2 is a plan view of essential components of the device.

A cam groove 66 is formed in the outer wall of the cam cylinder 61. The cam groove 66 is engaged with an engaging pin 2b protruded from the lens barrel 2a of the photographing lens 2. The cam groove 66, as shown in Fig. 2, consists of a retraction region 66a extended in the circumferential direction, a displacement region 66b inclined with respect to the axis, and an extension region 66c extended in the circumferential direction. The lens barrel 2a of the photographing lens 2 and the cam cylinder 61 are rotatably and slidably combined together.

The lens barrel 2a and the cam cylinder 61 moves together before they are operated by the auxiliary operating device 70. A transmission pin 67 extended from the rear surface of the cam cylinder 61 is engaged with the cam surface 13 of the cam member 10.

A main component of the auxiliary operating device 70 is an operating lever 72 which is pivotally supported on the camera housing in such a manner that it is rotatable about a pivot shaft hole 71. The operating lever 72 has an operating end portion 73 extended near the photographing lens 2. An operating ring 2c is secured to the end of the lens barrel 2a. A driven arm 2d is extended from the operating ring 2c towards the operating end portion 73 of the operating lever. An engaging pin 2e is embedded in the end portion of the arm 2d. The arm 2d is engaged through the pin 2e with an engaging elongated hole 74 formed in the operating end portion 73 of the operating lever 72. The operating lever 72 has an operating arm 75. An operating handle 75a is provided on the end of the arm 75.

The operating lever 72 has an operation output end portion 76 from which a pin 77 is extended. The pin 77 is inserted into an engaging elongated hole 5a which is formed in one end portion of a finder display interlocking lever 5. The interlocking lever 5 is pivotally supported on the camera housing in such a manner that it is rotatable about a pivot shaft hole 5b. The lever 5 has a transmission arm 5c is extended to a finder unit 6 (shown in the upper part of FIG. 1).

In the finder unit 6, a plate 6a on which a field frame indicating a photographing region has been printed is slidably supported on the camera housing through pins 6b and 6b and is urged to the right (in Fig. 1) by a spring. A pin 6c is protruded from the plate 6a. The pin 6c is engaged with a slide plate 6d. The transmission arm 5c of the finder display interlocking lever 5 has a slot 5d at the end portion, and an engaging pin 6e embedded in the slide plate 6d is engaged with the slot 5d.

The above-described pin 77 is engaged with a switch 7 adapted to detect the ordinary photographing mode and the macro-photographing mode. The switch 7 is connected to a flash unit 103, so as to decrease the quantity of emitted light in the macro-photographing operation. The switch 7 is further connected through the control circuit 101 to the displacement limiting member 40, so as to stop the member 40 at a predetermine position in the macro-photographing operation.

The lens focusing device thus constructed operates as follows:

FIG. 1 shows a state of the device in which the slider 20 is moved to the start position against the elastic force of the spring 24 by operating the cam mechanism 3 so that the locking portion 23 is engaged with the hook 4a of the release member 4, i.e., the slider is energized.

When the release button (now shown) is operated, the lever 4c is moved downwardly in FIG. 1. Accordingly, the hook 4a is operated by the pin 4d of the lever 4c, thus releasing the locking portion 23. As a result, the slider 20 energized by the spring 24 is moved to the left in FIG. 1. In this case, the slider is moved at a constant speed with the aid of the governor mechanism 50.

As the slider 20 is moved as described above, the arm 21 locking the engaging piece 17 is moved so that the cam member 10 is turned counterclockwise in FIG. 1 by the elastic force of the spring 16. As a result, the state of engagement of the cam surface 13 and the transmission pin 67 is changed; i.e., the pin 67 is pushed forwardly, so that the photographing lens 2 and the cam cylinder 61 are moved, as one unit, forwardly along the guide bar 64.

As the rotary cam member 10 is turned as described above, the contact 31 is also turned, so that the displacement signal is produced according to the movement of the contact relative to the signal generating board 32. The signal is applied to the control circuit 101, where it is compared with the displacement detection signal from the distance detecting unit. According to the result of comparison, the control circuit controls the displacement limiting member 40.

When the distance to the object represented by the displacement signal coincides with the distance to the object represented by the distance detection signal, the attraction of the control lever 41 by the magnet 46 is released, and the locking pawl 44 is engaged with one of the arcuate teeth 19, thus stopping the rotation of the cam member 10. Thus, the extension of the photographing lens is stopped, and focusing the latter on the object is acomplished.

After the cam member 10 has been stopped, the slider 20 is further moved. As a result, the end of the engaging portion 22 of the slider pushes the shutter switch (not shown). Thus, the photographing operation has been achieved.

When the film is wound for the next photographing operation, the cam mechanism 3 is operated; i.e., the charge lever 3c is turned by the cam 3a so that the pin 3e pushes the engaging portion 22 of the slider 20 to move the latter to the right in FIG. 1. As a result, the locking portion 23 is locked to the hook 4a, and the slider 20 is held at the start position being energized.

At the same time, the cam member 10, being pushed by the arm 21, is returned to its original position, and the photographing lens 2 and the cam cylinder 61 are also returned to the original position by the elastic force of the spring 65.

The ordinary photographing operation is carried out according to the above-described operating cycle.

In the macro-photographing operation, the auxiliary lens drive device 60 is operated by the auxiliary operating device 70.

In FIGS. 1 and 2, the auxiliary lens drive device 60 has been in the macro-photographing mode. The engaging pin 2b of the photographing lens 2 is engaged with the extension region 66c of the cam groove 66 so that the lens 2 is extended greatly forwardly.

When, under this condition, the shutter release button is depressed, similarly as in the ordinary photographing operation the hook 4a of the release member 4 is disengaged from the locking portion 23 of the slider 20. In this case, the control circuit 101 detects it with the aid of the switch 7 that the camera is in the macro-photographing mode, thereby to operate the displacement limiting member 40. As a result, the locking pawl 44 is engaged with one of the arcuate teeth 19 at the end of rotation of the cam member 10. Therefore, the cam member 10 will never be excessively rotated; i.e., it is turned as much as required at all times.

When the slider 20 is moved to the end of movement stroke thereof, the end of the engaging portion 22 pushes the shutter switch to release the shutter. Thus, the macro-photographing operation has been accomplished. In the macro-photographing mode, the finder unit 6 is operated by the finder display interlocking lever 5 so that the plate 6a indicates the macro-photographing region. Therefore, the field of vision can be correctly set. Furthermore, as the quantity of light emitted by the flash unit 103 is decreased, excessive exposure can be avoided.

The macro-photographing mode can be switched over to the ordinary photographing mode by turning the operating handle 75a counterclockwise. In this case, the photographing lens 2 is turned clockwise (in FIG. 1) by the driven arm 2d, as a result of which the engaging pin 2b is moved along the cam groove 66. Since the displacement region 66b of the cam groove 66 is inclined with respect to the axis, the engaging pin 2b is moved backwardly and accordingly the photographing lens is also moved backwardly.

The retraction region 66a is extended circumferentially as described before. Therefore, after the engaging pin 2b has been locked to the region 66a, the cam cylinder 61 and the photographing lens 2 are not moved relative to each other even if the cam surface 13 pushes the cam cylinder 61 through the transmission pin 67 in the ordinary photographing operation.

The rotation of the operating lever 72 for switching the macro-photographing mode over to the ordinary photographing mode is applied through the interlocking lever 5 and the slide plate 6d to the plate 6a to move the latter, so that the plate 6a indicates the ordinary photographing field.

The control circuit 101 detects it with the aid of the switch 7 pushed by the pin 77 that the macro-photographing mode has been switched over to the ordinary photographing mode, to allow the displacement limiting member 40 to operate in the ordinary photographing mode.

In the above-described embodiment, in the control operation of the control circuit which has detected it with the aid of the switch 7 that the ordinary photographing mode has been switched over to the macro-photographing mode the rotary cam member 10 is stopped at the end of its rotation stroke; however, the device may be so designed that the cam member is stopped at the start of its rotation stroke.

We claim:

1. A focusing device in a camera, which comprises:
   lens barrel means having a lens system, said lens barrel means together with said lens system being moved along the optical axis to focus said lens system on an object located in the range of ordinary photographing distances and on an object located in the range of closest focusing distances shorter than said ordinary photographing distances;
   detecting means for detecting a distance to an object, to provide an output signal according to said distance thus detected;
   main drive means for moving said lens barrel means in response to said output signal provided by said detecting means, to focus said lens system on said object located in the range of ordinary photographing distances; and
   auxiliary drive means with a member operated by the operator, said auxiliary drive means moving said lens barrel means independently of said main drive means, to focus said lens system on said object located in the range of closest focusing distances.

2. A device as claimed in claim 1, in which said main drive means and auxiliary drive means are adapted to move said lens barrel means respectively in the range of movement which are continuous to each other but different from each other.

3. A device as claimed in claim 1, in which said auxiliary drive means comprises: switch means which is operated when said operating member is operated; and disabling means for disabling the response of said main drive means to said output signal in response to the operation of said switch means.

4. A device as claimed in claim 3, in which said disabling means includes means for operating said main drive means to move said lens barrel means to a predetermined position.

5. A device as claimed in claim 1, in which said camera has a flash unit for illuminating an object, and which further comprises: switch means which is operated when said operating member is operated, to output an instruction signal to decrease the quantity of light emitted by said flash unit.

* * * * *